US012017587B2

(12) United States Patent
De Weser et al.

(10) Patent No.: US 12,017,587 B2
(45) Date of Patent: Jun. 25, 2024

(54) VEHICLE DRIVING AND MONITORING SYSTEM, VEHICLE INCLUDING THE VEHICLE DRIVING AND MONITORING SYSTEM, METHOD FOR MAINTAINING A SITUATIONAL AWARENESS AT A SUFFICIENT LEVEL, AND COMPUTER READABLE MEDIUM FOR IMPLEMENTING THE METHOD (71) Applicants: TOYOTA JIDOSHA KABUSHIKI KAISHA, Toyota (JP); UNIVERSITÉ GUSTAVE EIFFEL, Marne-la-Vallée (FR)

(72) Inventors: Marleen De Weser, Wilsele (BE); Thierry Bellet, Lyons (FR)

(73) Assignees: TOYOTA JIDOSHA KABUSHIKI KAISHA, Toyota (JP); UNIVERSITÉ GUSTAVE EIFFEL, Marne-la-Vallée (FR)

( * ) Notice: Subject to any disclaimer, the term of this patent is extended or adjusted under 35 U.S.C. 154(b) by 330 days.

(21) Appl. No.: 17/231,116

(22) Filed: Apr. 15, 2021

(65) Prior Publication Data
US 2021/0323540 A1 Oct. 21, 2021

(30) Foreign Application Priority Data

Apr. 16, 2020 (EP) ..................................... 20315183

(51) Int. Cl.
*B60R 1/27* (2022.01)
*B60W 30/08* (2012.01)
(Continued)

(52) U.S. Cl.
CPC ............... *B60R 1/27* (2022.01); *B60W 30/08* (2013.01); *B60W 50/14* (2013.01); *G06F 18/24* (2023.01);
(Continued)

(58) Field of Classification Search
CPC ................ B60W 30/08; B60W 50/14; B60W 2050/146; B60W 2420/403; B60W 2554/4049; G06V 20/58
See application file for complete search history.

(56) References Cited

U.S. PATENT DOCUMENTS

| 10,332,292 B1* | 6/2019 | Arnicar .................. G06F 3/011 |
| 2009/0102858 A1* | 4/2009 | Eggers .................. G06V 20/58 |
| | | 345/617 |

(Continued)

FOREIGN PATENT DOCUMENTS

| EP | 1300717 A2 | 4/2003 |
| FR | 3068945 A1 | 1/2019 |

*Primary Examiner* — Ian Jen
*Assistant Examiner* — Renee LaRose
(74) *Attorney, Agent, or Firm* — Dickinson Wright, PLLC (57) ABSTRACT

A vehicle driving and monitoring system includes
  an driving system including a situation analysis and planning unit, configured to determine vehicle situation information;
  a vehicle situation summary determination system configured, based on the vehicle situation information, to calculate a situational image; the situational image being a surround view of the vehicle calculated so that:
    at least one stationary element or mobile object which is located within an outline defining the situational image is not shown in the situational image or is shown in a less visible way, and/or
    additional driving information is shown in the situational image; and
  a vehicle situation summary output system including a display device configured to continuously display the situational image when the vehicle is moving.

14 Claims, 5 Drawing Sheets

(51) Int. Cl.
*B60W 50/14* (2020.01)
*G06F 18/24* (2023.01)
*G06V 20/56* (2022.01)
*G06V 20/58* (2022.01)

(52) U.S. Cl.
CPC .............. *G06V 20/56* (2022.01); *G06V 20/58* (2022.01); *B60W 2050/146* (2013.01); *B60W 2420/403* (2013.01); *B60W 2554/4049* (2020.02)

(56) References Cited

U.S. PATENT DOCUMENTS

| | | | |
|---|---|---|---|
| 2015/0109444 A1* | 4/2015 | Zhang | G06V 20/58 348/148 |
| 2017/0097640 A1 | 4/2017 | Wang et al. | |
| 2017/0109940 A1* | 4/2017 | Guo | G06T 7/30 |
| 2018/0067488 A1 | 3/2018 | Pollach et al. | |
| 2018/0105107 A1* | 4/2018 | Hassan-Shafique | G06T 7/70 |
| 2020/0198660 A1* | 6/2020 | Bellet | G06V 20/56 |

\* cited by examiner

VEHICLE DRIVING AND MONITORING SYSTEM, VEHICLE INCLUDING THE VEHICLE DRIVING AND MONITORING SYSTEM, METHOD FOR MAINTAINING A SITUATIONAL AWARENESS AT A SUFFICIENT LEVEL, AND COMPUTER READABLE MEDIUM FOR IMPLEMENTING THE METHOD

CROSS-REFERENCE TO RELATED APPLICATION

This application claims priority to European Patent Application No. 20315183.2 filed on Apr. 16, 2020, incorporated herein by reference in its entirety.

BACKGROUND

1. Technical Field

The present disclosure relates to a vehicle driving and monitoring system, a vehicle including the vehicle driving and monitoring system, a method for maintaining a situational awareness at a sufficient level, and a computer readable medium for implementing the method.

2. Description of Related Art

Herein, a driving system configured to assist a driver of a vehicle and/or to perform automated driving tasks for driving the vehicle is any driving system, for instance an advanced driving assistance system (ADAS) or an automated driving system, which makes it possible for the vehicle to be driven at any level from 0 to 5 (inclusive) according to SAE norm J3016-2018.

In addition, a 'level-X vehicle' refers to a vehicle having a driving system configured so that the vehicle can be driven, by the driver and/or by its driving system, at level X according to SAE norm J3016-2018.

When a vehicle is moving in automated mode at level 3 to 5, the occupants of the vehicle do not need to pay constantly attention to the driving task. During these periods, the occupants of the vehicle, including the driver, can in principle focus on other tasks in the vehicle.

Therefore, during these periods, there is in principle no need to display specific information about the driving situation to the occupants or the driver of the vehicle. Often, the view on the outside that the occupants of the vehicle can have through the windows of the vehicle is considered sufficient to keep the occupants of the vehicle sufficiently aware of the situation of the vehicle. In addition, in some vehicles a map showing the location of the vehicle can also be displayed in the vehicle, to inform its occupants of the vehicle geographical position. Such map is at a large scale, and consequently gives about no information on the situation in the vicinity of the vehicle. In addition, it usually does not include real time information on the mobile objects (e.g. other vehicles, pedestrians, etc.) which are present around the vehicle.

However, at least in level-3 vehicles, it may be necessary for the driver of the vehicle to suddenly take over control of the vehicle. Indeed, in a level-3 vehicle, when the automated driving system judges that it cannot perform driving with sufficient safety, its sends to the driver a 'take-over-request' (TOR request), requiring the driver to immediately take over control of the vehicle.

In such circumstances, in most cases the driver simply takes over control of the vehicle by watching the road in front of the vehicle through the windscreen, understanding the situation, and then taking appropriate actions. In addition, as shown for instance in document FR3068945, when a TOR request is sent to the driver, images of the scene in front of the vehicle can be displayed to the driver by the automated driving system. These images can progressively include more and more elements of the external scene, in order to help the driver understand as quickly as possible the situation of the vehicle.

It has appeared however that, even with this latter system, it may be difficult for a driver of a vehicle to suddenly regain control of a vehicle, while (s)he was focused on other tasks.

SUMMARY

The present disclosure has been conceived in view of the above problem. A first purpose of the present disclosure is therefore to propose a vehicle driving system, configured to make it easier than in former systems for a driver of a vehicle to suddenly take over control of the vehicle when a TOR request is sent to her or him.

According to one aspect of the present disclosure a vehicle driving and monitoring system is provided. This system includes:
  a driving system configured to assist a driver of a vehicle and/or to perform automated driving tasks for driving the vehicle;
  the driving system including a situation analysis and planning unit, configured, based at least partly on environmental information relative to an environment of the vehicle, to determine vehicle situation information;
  a vehicle situation summary determination system configured, based on the vehicle situation information, to calculate a situational image of the vehicle and to update the situational image at each one of successive time steps, the situational image being a surround view of the vehicle, as seen from a viewpoint located higher than the vehicle; the vehicle situation summary determination system being configured to calculate the situational image so that, in the situational image:
    at least one stationary element or mobile object, which is located within an outline defining the situational image, is not shown in the situational image or is shown in a less visible way, and/or
    additional driving information is shown in the situational image, the additional driving information being:
      graphical information overlaid in the situational image, or
      information highlighting a representation of the vehicle and/or of the at least one stationary element or mobile object; and
  a vehicle situation summary output system comprising a display device configured to continuously display the situational image when the vehicle is moving.

Such a system is mainly designed for level-3 automated vehicles, but can be used also in level 1 or 2 automated vehicles, or level 4 or 5 automated vehicles.

In the above definition:
  The surround view of the vehicle is a view representing the vehicle and at least part of the environment of the vehicle on all sides of the vehicle (on 360° around the vehicle).

The 'outline defining the situational image' is the virtual curve defining the portion of the scene which is shown in the situational image.

A stationary element or mobile object which is shown 'in a less visible way' means shown 'in a less visible way compared with other stationary elements or mobile objects shown in the image. Various methods can be used to show an image item in a less visible way: for instance, the image item can be shown in grayscale, while the other image items are shown in colour; the image item can be shown blurred, or with low contrast, while the other image items are shown crisp, or with high contrast; etc.

The vehicle situation summary determination system may be configured to calculate the situational image so that additional driving information be included in the situational image.

Such additional driving information can be graphical information, integrated as an overlay in the situational image. Such graphical information can include symbols (for instance a symbol symbolizing a strong wind), text, trajectories of the vehicle or other surrounding vehicles, and/or the drivable region for the vehicle, etc.

The additional driving information can consist in highlighting one or more image items. For instance, the driving system might determine that there is a high risk of collision with a pedestrian; in this case, the vehicle situation summary determination system would determine that the image of the pedestrian (an example of an image item) should be highlighted. Such highlighting can be done for instance by colorizing the image of the pedestrian, adding a colored outline, showing a bounding box, etc.

The vehicle situation summary determination system may be configured to calculate the situational image of the vehicle as seen along a non-horizontal view axis.

The environmental information usually includes real-time information acquired by sensors of the vehicle. Consequently, the vehicle situation information usually includes real-time information on the mobile objects present in the immediate vicinity of the vehicle, typically at least those that are at a distance less than 100 meters in front of the vehicle.

The environmental information can also include non-real-time information about the environment of the vehicle, for instance based on a predetermined map of the region through which the vehicle is moving.

The idea of the present disclosure is to submit to the occupants of the vehicle, in particular the driver, a summary, which can inform her/him in an instant about the situation of the vehicle.

In this purpose, the situational image is specifically adapted, by comparison with an unedited image of the environment of the vehicle, either by removing non-essential information from the situational image (when at least one stationary element or mobile object which is located within the outline defining the situational image, and therefore should appear in the view, is not shown in the situational image or is shown in a less visible way), and/or by adding important driving information to the situational image (when additional driving information is added by highlighting some element(s) of the scene, and/or by overlaying graphical information in the situational image). In addition, the situational image is a surround view of the vehicle. This image can therefore represent the stationary elements and/or mobile objects present around the car.

Therefore, in a single view, an occupant of the vehicle, in particular the driver, can capture the main information related to the driving situation of the vehicle.

It should be noted that, although the display device is configured to continuously display said situational image when the vehicle is moving, the vehicle driving and monitoring may be configured in specific circumstances to have operating modes in which the situational image is not displayed. In particular, after a TOR request has been issued, another image than the situational image may be displayed on the display device.

In some embodiments, the vehicle situation summary determination system may be configured to calculate the situational image so that the situational image includes a representation of lane markings of all lanes of a road on which the vehicle is moving;

trajectory of the vehicle, and/or trajectory of at least one other vehicle or pedestrian;

a blinking turn indicator of another vehicle;

traffic lights or a stop sign, when the vehicle approaches an intersection where there are the traffic lights or the stop sign; and/or drivable and/or non-drivable regions of the road.

Indeed, for the situational image to be as efficient as possible, it may be preferable to include therein a representation of the most important elements around the vehicle. These elements may be shown 'as seen', in a realistic manner, or in a more schematic way.

In some embodiments, the vehicle situation summary determination system may be configured to calculate the situational image only on a basis of the vehicle situation information at a time step at which the situational image is calculated.

That is, the situational image is calculated in real-time.

For instance, the vehicle situation summary determination system may be configured so that, when it calculates the situational image:

any decision not to show, or to show in a less visible way, in the situational image, said at least one stationary element or mobile object which should appear in the view; and any decision to show said additional driving information in the situational image, is made only on the basis of the vehicle situation information at the time step at which the situational image is calculated.

In some embodiments, the situation analysis and planning unit may be configured to identify stationary elements and/or mobile objects around the vehicle, and to calculate the vehicle situation information so that the vehicle situation information includes:

at least one estimated future trajectory, estimated for the vehicle and/or for at least one mobile object identified around the vehicle; and/or at least one estimated collision risk level and/or priority rankings, for the vehicle and/or for at least one mobile object identified around the vehicle; and the additional driving information may include information related to the at least one estimated future trajectory and/or the at least one estimated collision risk level and/or priority rankings.

In some embodiments, the situation analysis and planning unit may be configured to identify stationary elements and/or mobile objects around the vehicle, so that the vehicle situation information includes information of the identified stationary elements and/or mobile objects;

the vehicle situation summary determination system may include an elements and mobile objects classification unit configured, based on the vehicle situation information, to classify the identified stationary elements and mobile objects between those which are to be shown in the situational image, those which are not to be shown in the situational image, and those which are to be shown in the less visible way; and the vehicle situation summary determination system may be configured to calculate the situational image based on the classification performed by the elements and mobile objects classification unit.

The situational image can be calculated with a usual non-deforming projection.

However, in some embodiments the situational image may be a fish-eye view. Consequently, despite its limited size, the situational image can include both information relative to the vicinity of the vehicle and also information relative to the more distant environment of the car. The situational image therefore, in one look, can transmit to the occupants of the vehicle most of the important information relative to the situation of the vehicle on the road.

In some embodiments, the driving system may include a vehicle environment identification unit, configured at successive time steps, to calculate a 2D- or 3D-model of the environment of the vehicle, based on the environmental information; and the vehicle situation summary determination system may be configured to calculate the situational image of the vehicle at said successive time steps based on the 2D- or 3D-model calculated by the vehicle environment identification unit.

In some embodiments, the vehicle situation summary determination system may be configured to calculate the situational image so that a center of the vehicle in the situational image appears located strictly in a lower half of the situational image. Consequently, the center of the vehicle appears in the situational image at a distance below the horizontal mid-line (mid-height) of the image.

In some embodiments, the view axis may form an angle between 8° and 24° relative to the vertical direction.

In some embodiments, the vehicle situation summary determination system may include a vehicle situation summary parameters determination unit, configured to automatically calculate parameters used to calculate the situational image.

At least one of these parameters may be calculated, in some embodiments, based on at least one of a speed of the vehicle, and/or an acceleration of the vehicle, etc.

For instance, the vehicle situation summary parameters determination unit may be configured to update a projection angle used to calculate the situational image and/or a height of the viewpoint above the vehicle, based on a speed of the vehicle. For instance, the vehicle situation summary parameters determination unit may be configured to reduce the view angle at low speed (the view angle being the angle under which the part of the scene shown in the situational image appears, as seen from the viewpoint).

The present disclosure further encompasses a vehicle including the vehicle driving and monitoring system as defined above.

A second aspect of the present disclosure provides a method for maintaining a situational awareness of one or more occupants of a vehicle at a sufficient level.

This method includes:
  acquiring environmental information relative to the vehicle;
  based on the environmental information, determining vehicle situation information;
  based on the vehicle situation information, calculating a situational image of the vehicle and updating the situational image at each one of successive time steps; the situational image being a surround view of the vehicle, as seen from a viewpoint located higher than the vehicle; and
  the situational image being calculated so that, in the situational image:
    at least one stationary element or mobile object which is located within an outline defining the situational image is not shown in the situational image or is shown in a less visible way, and/or
    additional driving information is shown in the situational image, the additional driving information being:
      graphical information overlaid in the situational image, or
        information highlighting a representation of the vehicle and/or of the at least one stationary element or mobile object; and
  continuously displaying the situational image in the vehicle when the vehicle is moving.

Thanks to the situational image displayed, the driver (or other occupants) of the vehicle can periodically check the situational image so as to remain aware of the situation of the vehicle.

Thanks to this method, the driver or the occupants of the vehicle can be advised about the drivable space in front of the vehicle, and/or the future trajectory estimated for the vehicle (and possibly for surrounding vehicles).

Importantly, such advice, that is, the situational image, is displayed continuously. The proposed method is therefore, in particular during level 3- but also during level 1- or level 2 assisted driving, or even during level 4- or 5-automated driving, a decision support function, which helps a human take over manual control of the vehicle, so as to ensure safe driving thereof.

In some embodiments, the vehicle situation information determination step includes:
  identifying stationary elements and/or mobile objects around the vehicle, and
  calculating the vehicle situation information so that the vehicle situation information includes:
    at least one estimated future trajectory, estimated for the vehicle and/or for at least one mobile object identified around the vehicle; and/or
    at least one estimated collision risk level and/or priority rankings, for the vehicle and/or for at least one mobile object identified around the vehicle; and
  the additional driving information includes information related to the at least one estimated future trajectory and/or the at least one estimated collision risk level and/or priority rankings.

In some embodiments, the vehicle situation information determination step includes a step (S21) of identifying stationary elements and/or mobile objects around the vehicle, so that the vehicle situation information includes information of the identified stationary elements and/or mobile objects; and the situational image calculation step includes a step of, based on the vehicle situation information, classifying the identified stationary elements and mobile objects between those which are to be shown in the situational image, those which are not to be shown in the situational image, and those which are to be shown in the less visible way; whereby the situational image is calculated based on classification performed by a elements and mobile objects classification unit.

In a particular implementation, the method is determined by computer program instructions.

Accordingly, a third aspect of the present disclosure provides a non-transitory computer readable medium having stored thereon a computer program including instructions which, when the computer program is executed by a computer, cause the computer to carry out the above-defined method. The computer program may use any programming language, and be in the form of source code, object code, or code intermediate between source code and object code, such as in a partially compiled form, or in any other desirable form. The computer may be any data processing means, for instance a personal computer, an electronic control unit configured to be mounted in a vehicle, a smartphone, a laptop, etc.

The computer-readable medium may be an entity or device capable of storing the program. For example, the computer-readable medium may include storage means, such as a read only memory (ROM), e.g. a compact disk (CD) ROM, or a microelectronic circuit ROM, or indeed magnetic recording means, e.g. a floppy disk or a hard disk.

BRIEF DESCRIPTION OF THE DRAWINGS

The present disclosure may be better understood and its numerous other objects and advantages will become apparent to those skilled in the art by reference to the accompanying drawing wherein like reference numerals refer to like elements in the several figures and in which.

DESCRIPTION OF PREFERRED EMBODIMENTS

A vehicle driving and monitoring system 1000 (hereafter, 'system 1000') according to the present disclosure will now be presented.

Figure 3:
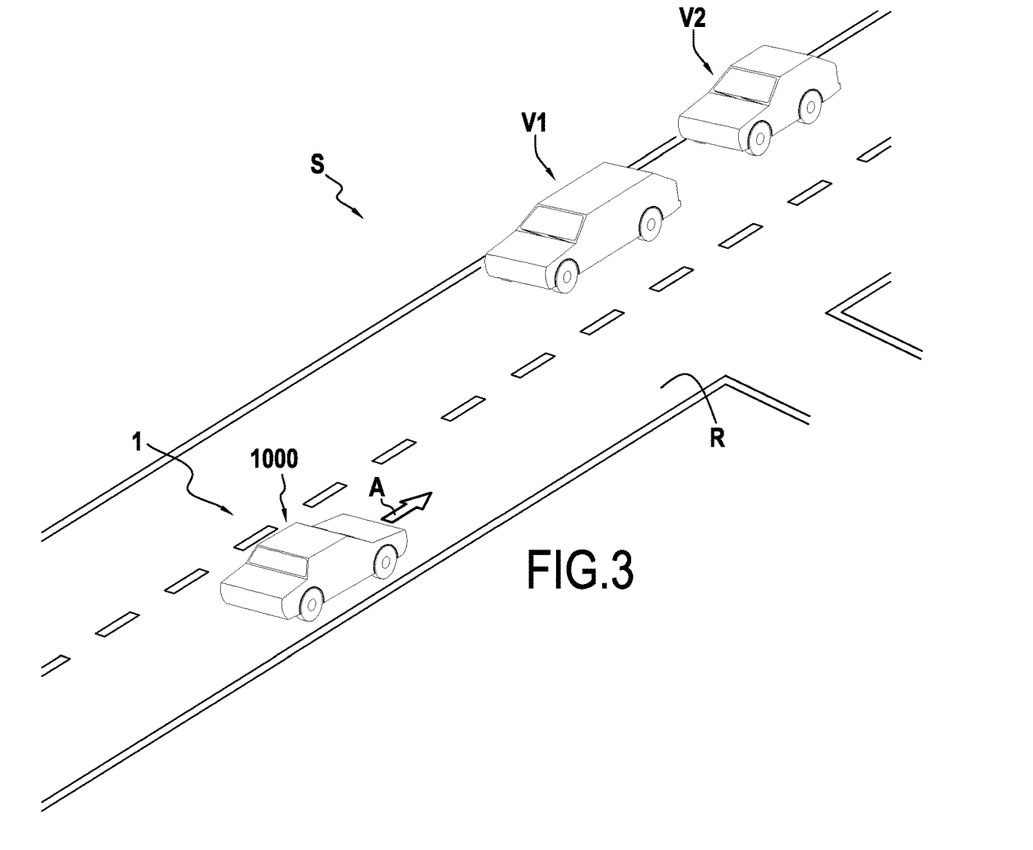
FIG. 3 is a schematic representation in perspective of a scene, on which the vehicle of FIG. 1 is moving.
Figure 4:
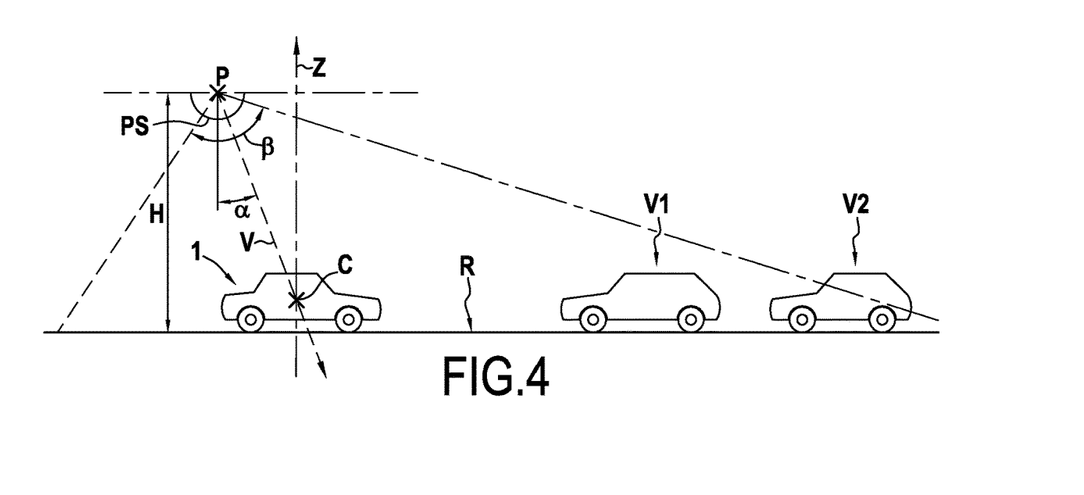
FIG. 4 is a schematic representation in lateral view of the scene shown on FIG. 3.
Figure 5:
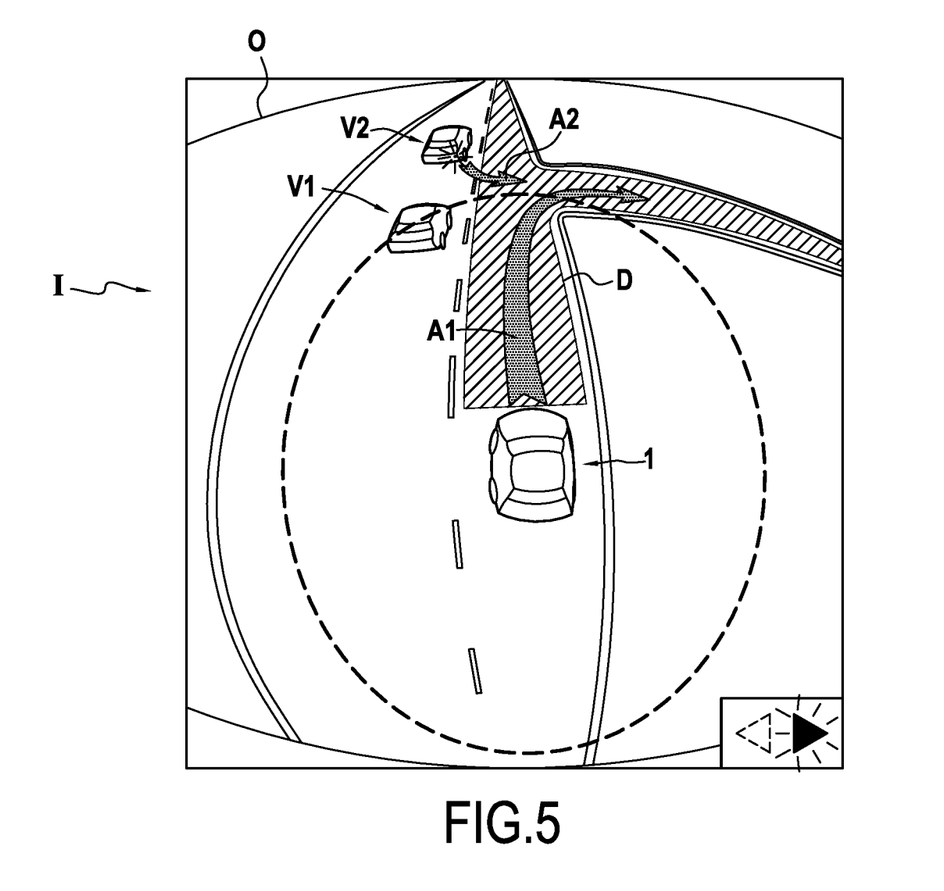
FIG. 5 is a schematic representation of situational image of the vehicle, calculated when it moves on the scene represented on FIGS. 3 and 4.

The functioning of system 1000 is illustrated by FIGS. 3-5. On these figures, system 1000 is presented in operation, mounted on a vehicle 1 which is moving on a road R.

FIG. 3 shows in perspective a scene S. In this scene, vehicle 1 is moving along a motion direction A, on the right lane of a road R. At this instant, two vehicles V1 and V2 are moving on the other lane of road R, in the opposite direction. FIG. 4 shows the same scene S, but from a lateral point of view.

Vehicle 1 is a hybrid car, which represents a non-limiting example of a vehicle on which a vehicle driving and monitoring system according to the present disclosure may be mounted. Vehicle 1 is driven by a drive system 200. The drive system 200 is the set of core components which operatively drive vehicle 1 and control its movement. These components include its engine/motor(s) (as the case may be), brakes, transmission, steering column, etc.

General Architecture of System 1000
Functional Architecture

System 1000 is essentially a vehicle driving system, capable of driving vehicle 1 in level 3 automated mode.

When vehicle 1 is moving in automated mode (in particular in level 3 automated mode), system 1000 displays to the driver a summary of the vehicle situation information of vehicle 1. This vehicle situation summary is constituted by the above-presented situational image of the vehicle. By having a look at this image from time to time, the driver can remain sufficiently aware of the driving situation of the vehicle, without committing a high level of attention to the situation of the vehicle.

Figure 1:
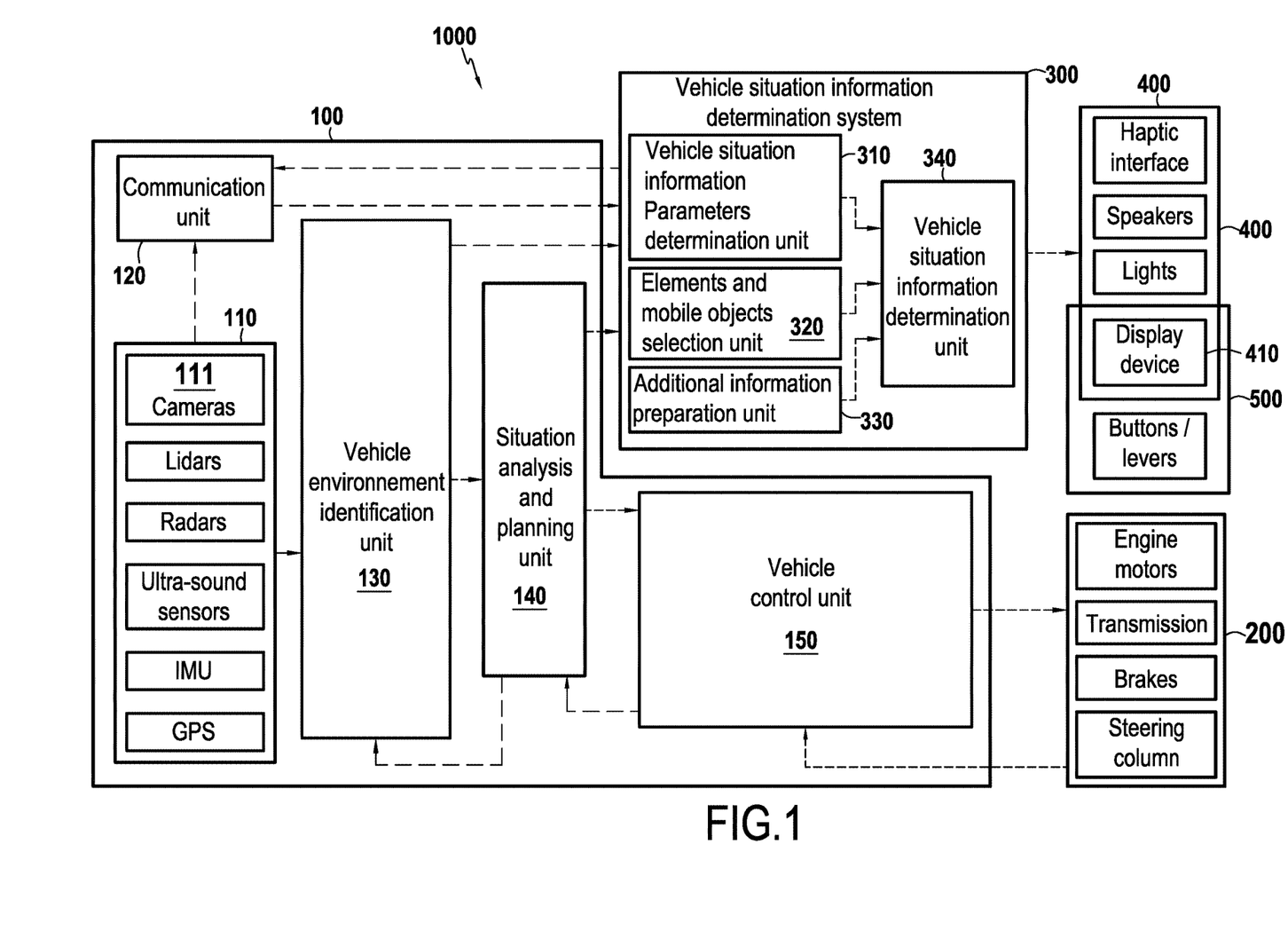
FIG. 1 is a schematic functional representation of a vehicle comprising a vehicle driving and monitoring system according to the present disclosure.

The functional architecture of system 1000 is shown schematically on FIG. 1.

In order to perform its driving function, system 1000 comprises a driving system 100, which is configured to control the drive system 200 of vehicle 1 at level 3 (SAE norm J3016-2018). Driving system 100 can therefore control acceleration, braking and turning of vehicle 1. The driving and monitoring system of the present disclosure, in other embodiments, can of course be implemented in vehicles comprising a driving system 100 capable of driver assistance at level 1 or 2, or capable of automated driving at level 4 or 5.

In order to drive vehicle 1 in 'manual mode', the driver can use a steering wheel, brakes/clutch/accelerator pedals, buttons, touchscreens, etc, so as to control the drive system 200. These components collectively constitute a vehicle input system 500, which forms part of system 1000.

Since the driving system 100 is a driving system capable of level 3 operation, when the driving system 100 judges that it cannot control the vehicle with a sufficient level of safety, it transmits a take-over-request (TOR request) to the driver of the vehicle. The driver must then take over control of the vehicle, and in principle has at least a few seconds to understand the situation of the vehicle, before effectively taking control of the vehicle and effectively applying his/her controls to the vehicle (e.g. before effectively controlling the position of the steering wheel, pressing the brakes/clutch/accelerator pedals, etc.).

In addition, in order to keep the driver of vehicle 1 sufficiently aware of the driving situation of vehicle 1 at all times while vehicle 1 is driven in automated mode, system 1000 further comprises a vehicle situation summary determination system 300 and a vehicle situation summary output system 400.

The vehicle situation summary determination system 300 is a system which determines and updates at successive time steps the vehicle situation summary presented previously.

The vehicle situation summary output system 400 is a system which outputs (including in particular, displays) the vehicle situation summary determined by the vehicle situation summary determination system 300. In this purpose, it mainly comprises a display device 410. Display device 410 essentially comprises a display configured to continuously display the situational images I calculated by the vehicle situation summary determination system 300. The output of the vehicle information summary may further include a haptic, visual, sound (e.g., beeps) signals, outputted by the vehicle situation summary output system 400.

In the present embodiment, the touchscreen display of display device 410 belongs both to the vehicle situation summary output system 400 and to the vehicle input system 500.

Material Architecture

Figure 2:
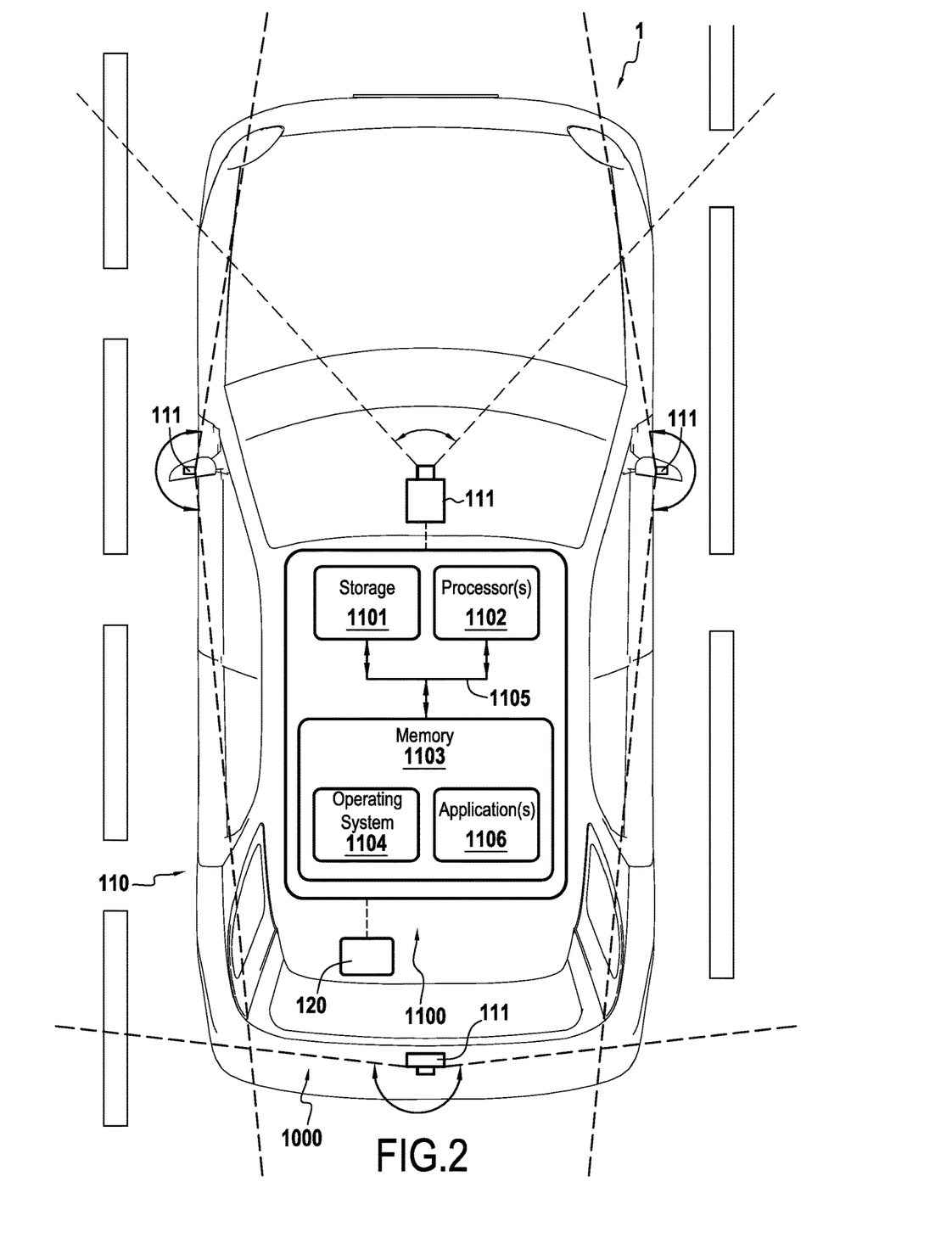
FIG. 2 is a schematic representation of the material components of the vehicle of FIG. 1.

The material architecture of system 1000 is shown schematically on FIG. 2. It is composed mainly by a central driving computer system 1100, mounted on vehicle 1.

Importantly, most hardware components of system 1000 are shared components, which are used to perform multiple tasks. For this reason, the hardware components which constitute the driving system 100 perform the functions of system 100, but also perform other functions for system 1000, for instance the determination of the vehicle information summary (they constitute then the vehicle situation summary determination system 300), as will be explained below.

In addition, although the driving computer system 1100 in this embodiment is physically located in vehicle 1, it does not necessarily need to be in the vehicle. Actually, it can be located anywhere, as long as communication equipment is provided to transmit the necessary inputs to computer system 1100, and to transmit the calculated information to the output system 400 (in particular to the display 410) for it to be displayed or outputted, and to transmit the calculated controls to the drive system 200, in real time, so as to drive vehicle 1.

Moreover, although the driving computer system 1100 is represented on FIG. 1 in a single box, it may comprise one or more processors, and can therefore be a distributed calculation system, distributed over a plurality of processors, possibly physically arranged on different locations.

The driving system 100 comprises a set of sensors 110 and a communication unit 120.

The sensors 110 are a set of sensors comprising cameras, lidars, radars, ultra-sound proximity sensors, an inertial measurement unit (IMU), and a GPS. The cameras, lidars, radars and ultra-sound proximity sensors of sensors 100 are mounted on the front, back and sides of vehicle 1 (Among sensors 110, only four external cameras 111 are shown on FIG. 2). Preferably, the cameras 111 are arranged so as to acquire a full 360° view around vehicle 1.

The communication unit 120 is a set of telecommunications components.

These components make it possible for vehicle 1 (that is, for the systems aboard vehicle 1, and for the occupants of vehicle 1) to communicate with its environment. The communication unit 120 for instance enables communication between vehicle 1 and the infrastructure (V2I communication), other vehicles (V2V communication), and/or with more distant machines or persons.

The functions (the functional units) of driving system 100 and of the vehicle situation summary determination system 300 are implemented on the computer system 1100.

Computer system 1100 comprises a storage 1101, one or more processor(s) 1102, a memory 1103, an operating system 1104, a communication infrastructure 1105 and additional applications 1106.

The computer system 1100, in particular in its memory 1103, stores instructions which when executed by the one or more processor(s) 1102 cause the one or more processor(s) 1102 to implement the different functional units or systems of system 1000.

The one or more processors 1102 are intended to be representative of the presence of any one or more processors or processing devices, of any of a variety of forms. For example, the processor(s) 1102 is intended to be representative of any one or more of a microprocessor, a central processing unit (CPU), a controller, a microcontroller unit, an application-specific integrated circuit (ASIC), an application-specific instruction-set processor (ASIP), a graphics processing unit (GPU), a digital signal processor (DSP), a field programmable gate array (FPGA), a programmable logic device (PLD), a physics processing unit (PPU), a reduced instruction-set computer (RISC), or the like, or any combination thereof. The processor(s) 102 can be configured to execute program instructions including, for example, instructions provided via software, firmware, operating systems, applications, or programs, and can be configured for performing any of a variety of processing, computational, control, or monitoring functions.

The communication infrastructure 1105 is a data bus to which all the above-mentioned sensors 110 and the communication unit 120 are connected, and therefore through which the signals outputted by these sensor units and this communication unit are transmitted to the other components of system 1000.

The storage 1101, the processor(s) 1102, the memory 1103, and the operating system 1104 are communicatively coupled over the communication infrastructure 1105. The operating system 1104 may interact with other components to control one or more applications 1106. All components of system 1000 are shared or possibly shared with other units or items of equipment of vehicle 1.

A computer program to perform object detection according to the present disclosure is stored in memory 1103. This program, and the memory 1103, are examples respectively of a computer program and a computer-readable recording medium pursuant to the present disclosure.

The memory 1103 of the computer system 1100 indeed constitutes a recording medium according to the disclosure, readable by the one or more processor(s) 1102 and on which said program is recorded.

The systems and methods described herein can be implemented in software or hardware or any combination thereof. The systems and methods described herein can be implemented using one or more computing devices which may or may not be physically or logically separate from each other.

The systems and methods described herein may be implemented using a combination of any of hardware, firmware and/or software. The present systems and methods described herein (or any part(s) or function(s) thereof) may be implemented using hardware, software, firmware, or a combination thereof and may be implemented in one or more computer systems or other processing systems.

In one or more embodiments, the present embodiments are embodied in vehicle-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a vehicle-readable medium having instructions stored on it. The instructions can be used to program any processor or processors (or other electronic devices) to perform a process or method according to the present exemplary embodiments. In addition, the present disclosure can also be downloaded and stored on a computer program product.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

Driving System 100

The functional units of driving system 100 comprise a vehicle environment identification unit 130, a situation analysis and planning unit 140 and a vehicle control unit 150.

In the driving system 100, the sensors 110 are configured to acquire all the information that can be gathered relative to the surroundings of vehicle 1, as known per se. This information constitutes the main part of the 'environmental information'. When vehicle 1 is in operation, sensors 110 acquire information periodically at successive time steps, in real time. Usually, a constant interval is set between these successive time steps, for instance 25 ms.

All the information acquired by sensors 110 and all the information acquired from other machines (e.g., from a database containing a map of the region where vehicle 1 is moving) by the communication unit 120 is transmitted to the vehicle environment identification unit 130. This information can include in particular image sequences acquired by cameras, clouds of (3D-) points outputted by lidars, etc.

Based on the environmental information, the vehicle environment identification unit 130 performs data fusion to obtain 2D- or 3D-data (for instance a point cloud), geolocalized around vehicle 1. Based on this latter information and/or on the environmental information, the vehicle environment identification unit 130 (preferably at each time step) identifies the stationary elements and the mobile objects which are around vehicle 1.

The stationary elements are the elements of the infrastructure: the surface of the road, preferably in particular the road markings; the traffic signs; the curbs, buildings, trees, street lights, etc. To detect these elements, the vehicle environment identification unit 130 can possibly rely on a (predetermined) map of the surroundings of the vehicle. This map can be stored in a memory of system 1000, or can be downloaded via communication unit 120.

The mobile objects are the vehicles, the robots, the pedestrians, the animals.

To detect and identify the stationary elements and the mobile objects, the vehicle environment identification unit 130 preferably also relies on the identifications of stationary elements and mobile objects performed at previous time steps.

The vehicle environment identification unit 130 establishes a model of the surroundings of the vehicle. This model can be in 2D or in 3D. It can include numeric and/or semantic information. It preferably includes data defining the stationary elements and the mobile objects identified around vehicle 1, if they have been identified.

This model preferably comprises the shape(s) of the stationary element(s) and/or the mobile object(s) detected around the vehicle.

Usually, the environmental information is periodically acquired from sensors 110 and communication unit 120. On this basis, the vehicle environment identification unit 130 usually updates periodically at each time step the model of the surroundings of the vehicle. For instance, vehicle environment identification unit 130 may update at each time step its model of the environment of the vehicle, in which the detected elements and/or mobile objects are described in 2D or 3D.

The situation analysis and planning unit 140 uses the model of the surroundings of the vehicle, as calculated by the vehicle environment identification unit 130, to analyse the situation of the vehicle. Based on this information, it calculates situation information of the vehicle. The situation information of the vehicle is information describing the situation of the vehicle and of the surrounding mobile objects, with respect to the infrastructure. It preferably includes past and present information about the position, trajectory, speed, acceleration, of the vehicle and of the mobile objects surrounding the vehicle. For instance, this information includes a record of these values over the last period, e.g. during the last 10 seconds.

Moreover, the vehicle situation information further preferably comprises information about the future estimated position, trajectory, speed, acceleration, of the vehicle and of the mobile objects surrounding the vehicle.

For instance, in the proposed exemplary embodiment of FIGS. 3-5, the vehicle situation information comprises information about the future estimated positions, trajectories, speeds, accelerations, of the vehicle 1 and of the vehicles V1 and V2. In addition, it has been detected that the side indicator of vehicle V2 is blinking, suggesting that vehicle V2 intends to turn into the small road on the right. This information is included in the vehicle situation information.

The trajectory, speed and acceleration deemed preferable for vehicle 1 in the time period ahead are passed to the vehicle control unit 150. Based on this information, the vehicle control unit 150 determines the controls to be sent to the drive system 200. Based on these controls, the drive system 200 drives vehicle 1 so as to follow the expected trajectory at the expected speed and acceleration.

In addition, the situation analysis and planning unit 140 further determines the estimated collision risk level between each pair of mobile objects in the scene, in particular between vehicle 1 and any of the surrounding mobile objects. It also determines priority rankings for the vehicle and/or for the mobile objects identified around the vehicle. Priority rankings defines, when the trajectories of two or more mobile objects are such that the considered object have to follow these trajectories successively (i.e., they cannot follow these trajectories at the same time, otherwise a collision would occur), the order in which the mobile objects have to follow their respective trajectories, in order to comply with the Code of the Road and the normal driving practice. The estimated collision risk levels and the priority rankings are recorded as part of the vehicle 1 situation information.

Vehicle Situation Summary: Determination System 300 and Output System 400

To calculate the vehicle situation summary, the vehicle situation summary determination system 300 comprises four functional calculation units 310, 320, 330 and 340, which cooperate to determine the vehicle situation summary at each time step. Units 310, 320, 330 perform preliminary calculations: They determine respectively the parameters of the vehicle situation summary, those of the detected stationary elements and mobile objects which are to be shown in the situational image, and the additional information which has to be overlaid on or integrated into the situational image. Based on this information, unit 340 determines the vehicle situation summary, that is, calculates the situational image.

The function of the vehicle situation summary parameters determination unit 310 is to determine the values of the parameters of the vehicle situation summary.

In particular, unit 310 calculates and updates at each time step the parameters of the situational image. These parameters are typically optical parameters used to calculate this image (see FIG. 4): The location of the viewpoint P relative to the vehicle, from which the situational image is calculated; the direction of the optical (or viewing) axis V; the projection angle (in cross-section: angle β) through which the region around vehicle which is to be represented in the situational image is seen; and/or other parameters of the projection used to calculate the situational image.

An example of a situational image I is shown on FIG. 5. It represents the scene S shown on FIGS. 3 and 4.

This image I can be calculated for instance by virtually projecting the points of the 3D-model of the vehicle 1 and of its environment on a convex projection surface PS, placed around viewpoint P. This surface can for instance be the hemisphere PS centred on viewpoint P.

As shown on FIG. 4, the viewpoint P is located at a higher height H than the vehicle 1; it is located in the vertical plane containing the direction of motion of vehicle 1.

Viewpoint P is further located slightly behind vehicle 1 (as seen in top view, considering the direction of motion of vehicle 1). Accordingly, the view angle α forms a non-zero angle relative to the vertical direction; preferably an angle between 8° and 24°, for instance 16°.

The solid angle through which the region around vehicle 1 represented in the situational image is seen appears on FIG. 4, in cross-section, as an angle β.

The height H, the angles α and β, the position of the viewing axis V, are examples of parameters set by unit 320. For instance, the viewing axis V may pass, as seen from a lateral direction (e.g. the viewing direction of FIG. 4), behind vehicle 1, or through the center C of vehicle 1, or ahead of vehicle 1.

The unit 310 is configured to automatically adapt the values of the parameters of the situational image depending on the circumstances.

For instance, it can be configured, if it is determined that the speed of vehicle 1 is small, to select a lower height H for the viewpoint P over vehicle 1, and/or a smaller value for angle β than if the speed of vehicle 1 is high.

However, the unit 310 can maintain the parameters of the vehicle situation unchanged despite a decrease of the vehicle speed, if the vehicle situation analysis and planning unit 140 identifies that the reduction of the vehicle speed is temporary.

Also, unit 310 is configured, if the (forward) speed of the vehicle is high, to increase the height H and the angle α, in order to show a greater region in front of the vehicle than at low speed.

In the scene S of FIGS. 3 and 4, two mobile objects are identified around vehicle 1: the vehicles V1 and V2. Each of these vehicles can be shown, or not, (or be shown in a less visible way) in the situational image: Indeed, as one can see on FIG. 5, both vehicles V1 and V2 in the scene are located within the outline O defining the situational image.

For each of the identified mobile objects (vehicle V1 and V2), as well as for each stationary element (for instance, the road markings, the landscape, etc.), the elements and mobile objects classification unit 320 then selects which of these elements and mobile objects will be shown (or possibly, shown in a less visible way) in the situational image. This choice is based on the vehicle situation information provided by the situation and planning unit 140.

The vehicle situation information includes estimated collision risk levels, which are estimates of the probabilities of collision between vehicle 1 and the vehicles V1 and V2. Based on this information, the elements and mobile objects classification unit 320 determines whether the mobile objects (vehicles V1 and V2) are to be shown in the situational image: A mobile object is shown if the probability of collision of vehicle 1 with this object exceeds a predetermined threshold. In the present example, both vehicles V1 and V2 are to be shown.

The distance, the relative speed of the mobile objects surrounding vehicle 1, and other parameters, can also be taken into consideration by unit 320 to determine which stationary elements, and which mobile objects, have to be shown in the situational image I.

Typically, unit 320 selects the mobile objects which are closest to vehicle 1, and/or those with whom collision is most likely, as the objects which are to be displayed. The road and the traffic signs and markings are also generally selected to be included in the situational image.

On the other hand, unit 320 decides not to represent the landscape around the road R, except the horizon line; however, the road limits, the road markings are shown in the image.

Lastly, based on the model of the environment calculated by unit 130 and on the vehicle situation determined by the situation analysis and planning unit 140, the additional information preparation unit 330 selects and prepares the additional information which is to be included in the situational image I. This additional information is information extending beyond the normal representation of the vehicle and the surrounding mobile objects.

Such additional information may include warning messages for the driver, for instance warning messages relative to roadworks identified on or near the trajectory of the vehicle, etc. It can also include a path, superimposed in the situational image, showing the future trajectory that has been chosen by the driving system 100 for vehicle 1; and possibly the future trajectory estimated for the surrounding vehicles, for instance vehicles V1 and V2 of FIGS. 3-5. It can also include any symbolic sign displayed in the situational image.

In the examplary situation shown on FIGS. 3-5, unit 330 determines that the estimated future trajectory decided by the driving system 100 (vehicle 1 is to turn right at the next crossing) should be represented: This trajectory is therefore included to the situational image I, where it is represented by an arrow A1. The drivable region D of the road, where it is safe for vehicle 1 to drive, is also represented in very light green. The trajectory represented by the arrow A1, and the drivable region D, are examples of additional driving information overlaid in the situational image.

In addition, unit 330 has determines that a blinking triangle (an example of symbolic sign) showing that vehicle 1 intends to turn right, should also be displayed in image I.

Moreover, the vehicle situation information comprises information showing that the side indicator of vehicle V2 is blinking, and that vehicle V2 intends to turn in the small road on the right. It further comprises the estimated future trajectory of vehicle V2, and the estimated risk of collision between vehicle 1 and vehicle V2.

On the basis of this information, unit 330 first determines that the blinking side indicator should be represented in the situational image. Therefore, the situational image includes additional driving information: The representation of vehicle V2 is highlighted so as to show that the side indicators of vehicle V2 are blinking.

Unit 330 further determines that the estimated future trajectory of vehicle V2 should also be represented in the situational image. The estimated future trajectory therefore appears in the situational image as arrow A2.

This latter determination is made by unit 330 based on the collision risk levels included in the vehicle situation information. Since both vehicle 1 and vehicle V2 intend to drive into the road on the right at substantially the same time, the collision risk level for both vehicles is determined as being above a predetermined security threshold; consequently, unit 330 decides that the trajectories of both vehicles (in this embodiment) should be displayed in the situational image.

In addition, the vehicle situation information further includes the respective priority rankings for the vehicles 1 and V2, whose future trajectories overlap: It has been determined that vehicle 1 had a higher priority ranking than vehicle V2 for turning right.

Consequently, the additional information preparation unit 330 determines that arrow A1 should be coloured in bright green, while arrow A2 should be coloured in orange, to show that vehicle 1 has a higher priority than vehicle V2.

The display of these green and orange arrows A1,A2 in the situational image I constitutes helpful information for the occupants of vehicle 1, informing them about the priority ranking of vehicle 1 over vehicle V2.

Finally, on the basis of the model of the environment calculated by unit 130, of the vehicle situation information determined by the situation analysis and planning unit 140, of the situation summary parameters determined by unit 310, on the list of elements and mobile objects to be displayed determined by unit 320, of the additional information determined by unit 330, the vehicle situation summary determination unit 340 calculates the situation summary, that is, the situational image I (FIG. 5).

Since usually, the model of the environment of the vehicle calculated by the vehicle environment identification unit 130 is a 3D-model, the calculation of the situational image I is essentially a rendering of the 3D-scene; for instance, a rendering of the scene S shown on FIGS. 3-4.

More generally, the vehicle situation summary determination unit 340 may generate the situational image by any method. In particular, the situational image may be generated based on a 2D representation of the environment of the vehicle. It may also be generated directly on the basis of the images acquired by cameras 111.

The situational image can represent the 'self-vehicle' (the vehicle controlled by the driving system 100), the elements and the mobile objects around the vehicle in a more or less schematic way. For instance, the self-vehicle can be represented merely as a rectangle; but it can be also represented in a very realistic manner, as it would appear in a photo acquired from the viewpoint above the vehicle.

In the present embodiment, the situational image I is calculated using a fish-eye projection (FIG. 5). A fish-eye projection refers to a projection which produces an image having a greater image distorsion as it extends from the center thereof to the periphery thereof. In other embodiments, the situational image can be calculated using a regular, non deforming projection, instead of a fish-eye projection.

In other embodiments, as the case may be, the vehicle situation summary determination unit 340 also calculates other outputs which are also part of the vehicle information summary. For instance, it can determine additional sound, haptic, and/or visual signals, which are to be outputted by vehicle situation summary output system 400.

The vehicle situation summary is then transmitted to the occupants of vehicle 1 by the vehicle situation summary output system 400. In the present embodiment, the display device 410 displays the situational image I to the occupants of vehicle 1, in particular to its driver. If the vehicle summary comprises additional sound, haptic, and/or visual signals, they are transmitted, via appropriate components of the vehicle situation summary output system 400: via an haptic interface, speakers, controllable lights, a display device, etc.

Figure 6:
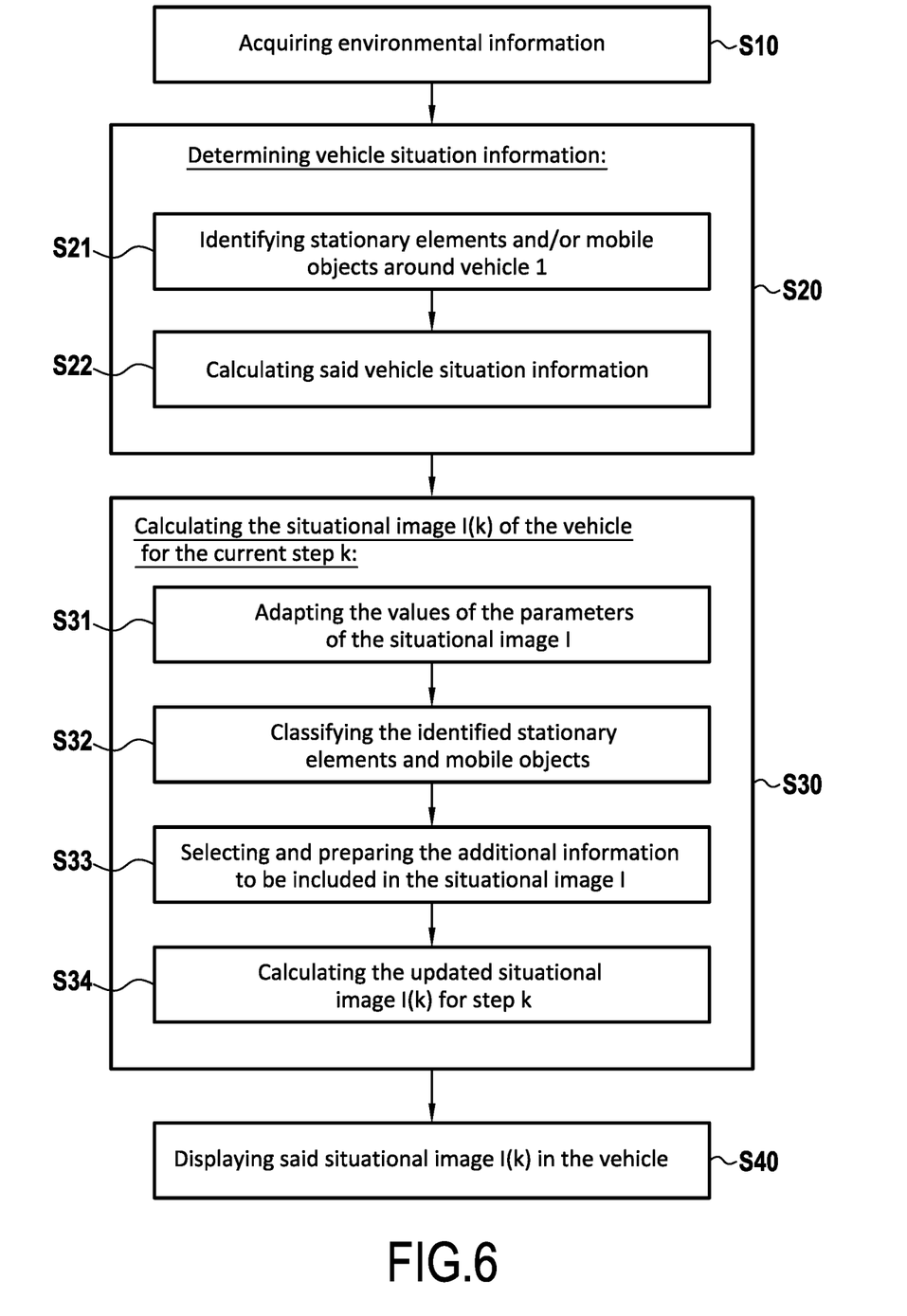
FIG. 6 is a block diagram representing an embodiment of a method for maintaining a sufficient level of situational awareness according to the present disclosure.

In summary, the present disclosure proposes the following method to maintain the situational awareness of the occupants of vehicle 1 at a sufficient level:

The method essentially consists in presenting to the occupants of the vehicle, and in particular to its driver, a summary of the driving situation of the vehicle. The method is to be applied in a vehicle. The summary consists essentially in the situational image of the vehicle.

The method is usually applied in a vehicle comprising a driving system configured to assist a driver of a vehicle and/or to perform automated driving tasks for driving the vehicle.

The method comprises the following steps:
S10) acquiring environmental information relative to a vehicle.
S20) based on said environmental information, determining vehicle situation information.

The vehicle situation information determination step (S20) includes two sub-steps:
S21) identifying stationary elements and/or mobile objects around the vehicle. The identified information is included to the vehicle situation information.
S22) calculating said vehicle situation information.

In this embodiment, the vehicle situation information is specifically calculated so as to include in particular:
the location, shape, colour, of the stationary elements and mobile objects surrounding vehicle 1;
the estimated future trajectory, of vehicle 1;
the estimated future trajectories of the mobile objects (i.e., vehicles V1 and V2) identified around the vehicle.
the estimated collision risk level between any mobile object (including vehicle 1) and other mobile objects;
priority rankings, for the vehicle and the mobile objects (vehicles V1 and V2) identified around the vehicle.
S30) based on said vehicle situation information, calculating the situational image (I(k)) of the vehicle (1) and updating said situational image (I(k)) at each one of successive time steps.

This situational image calculation step includes several sub-steps:
S31) based on the vehicle situation information, automatically adapting the values of the parameters of the situational image.
S32) based on the vehicle situation information, classifying the identified stationary elements and mobile objects between those which are to be shown in the situational image, those which are not to be shown in the situational image, and those which are to be shown in a less visible way; whereby said situational image (I(k)) is calculated based on the classification performed by the elements and mobile objects classification unit 320.
S33) based on the vehicle situation information, selecting and preparing the additional information which is to be included in the situational image I.
S34) calculating the situational image I.

When the vehicle situation information includes the above-mentioned information related to the future trajectories, the collision risk levels, and/or the priority rankings, said additional driving information includes information related to the estimated future trajectory(ies) and/or said to the estimated collision risk level(s) and/or priority rankings.

S40) continuously displaying said situational image I in the vehicle when the vehicle is moving.

Thanks to the situational image displayed, the driver of the vehicle can periodically check the situational image I so as to remain aware of the situation of the vehicle.

What is claimed is:

1. A vehicle driving and monitoring system, comprising a driving system configured to assist a driver of a vehicle and/or to perform automated driving tasks for driving the vehicle; the driving system comprising a situation analysis and planning unit configured, based at least partly on environmental information relative to an environment of the vehicle, to determine vehicle situation information;

a vehicle situation summary determination system configured, based on the vehicle situation information, to calculate a situational image of the vehicle and to update the situational image at each one of successive time steps; the situational image being a surround view of the vehicle, as seen from a viewpoint located higher than the vehicle; the vehicle situation summary determination system being configured to calculate the situational image so that:

at least one stationary element or mobile object which is located within an outline defining the situational image is not shown in the situational image or is shown in a less visible way, and additional driving information is shown in the situational image, the additional driving information being:

graphical information overlaid in the situational image, or information highlighting a representation of the vehicle and/or of the at least one stationary element or mobile object; and a vehicle situation summary output system comprising a display device configured to continuously display the situational image when the vehicle is moving;

wherein the situational image comprises at least a future trajectory of the vehicle and a future trajectory of at least one mobile object.

2. The vehicle driving and monitoring system according to claim 1, wherein the situation analysis and planning unit is configured to identify stationary elements and/or mobile objects around the vehicle, and to calculate the vehicle situation information so that the vehicle situation information includes:

at least one estimated future trajectory, estimated for the vehicle and/or for at least one mobile object identified around the vehicle; and/or at least one estimated collision risk level and/or priority rankings, for the vehicle and/or for at least one mobile object identified around the vehicle; and the additional driving information includes information related to the at least one estimated future trajectory and/or the at least one estimated collision risk level and/or priority rankings.

3. The vehicle driving and monitoring system according to claim 1, wherein the situation analysis and planning unit is configured to identify stationary elements and/or mobile objects around the vehicle, so that the vehicle situation information includes information of the identified stationary elements and/or mobile objects;

the vehicle situation summary determination system comprises an elements and mobile objects classification unit configured, based on the vehicle situation information, to classify the identified stationary elements and mobile objects between those which are to be shown in the situational image, those which are not to be shown in the situational image, and those which are to be shown in the less visible way; and the vehicle situation summary determination system is configured to calculate the situational image based on classification performed by the elements and mobile objects classification unit.

4. The vehicle driving and monitoring system according to claim 1, wherein the driving system comprises a vehicle environment identification unit, configured at successive time steps, to calculate a 2D- or 3D-model of the environment of the vehicle, based on the environmental information; and the vehicle situation summary determination system is configured to calculate the situational image based on the 2D- or 3D-model calculated by the vehicle environment identification unit.

5. The vehicle driving and monitoring system according to claim 1, wherein the vehicle situation summary determination system is configured to calculate the situational image so that a center of the vehicle in the situational image appears strictly located in a lower half of the situational image.

6. The vehicle driving and monitoring system according to claim 1, wherein the vehicle situation summary determination system comprises a vehicle situation summary parameters determination unit, configured to automatically calculate parameters used to calculate the situational image and to update a projection angle used to calculate the situational image and/or a height of the viewpoint above the vehicle based on a speed of the vehicle.

7. The vehicle driving and monitoring system according to claim 1, wherein the situational image is a fish-eye view.

8. The vehicle driving and monitoring system according to claim 1, wherein the vehicle situation summary determination system is configured to calculate the situational image so that the situational image comprises a representation of lane markings of all lanes of a road on which the vehicle is moving;

a trajectory of the vehicle, and/or a trajectory of at least one other vehicle or pedestrian;

a blinking turn indicator of another vehicle;

traffic lights or a stop sign, when the vehicle approaches an intersection where there are the traffic lights or the stop sign; and/or drivable and/or non-drivable regions of the road.

9. The vehicle driving and monitoring system according to claim 1, wherein the vehicle situation summary determination system is configured to calculate the situational image only on a basis of the vehicle situation information at a time step at which the situational image is calculated.

10. A vehicle including the vehicle driving and monitoring system according to claim 1.

11. A method for maintaining a situational awareness of one or more occupants of a vehicle, the method comprising:

acquiring environmental information relative to the vehicle;

based on the environmental information, determining vehicle situation information;

based on the vehicle situation information, calculating a situational image of the vehicle and updating the situational image at each one of successive time steps; the situational image being a surround view of the vehicle, as seen from a viewpoint located higher than the vehicle; and the situational image being calculated so that, in the situational image:
- at least one stationary element or mobile object which is located within an outline defining the situational image is not shown in the situational image or is shown in a less visible way, and
- additional driving information is shown in the situational image, the additional driving information being:
- graphical information overlaid in the situational image, or
- information highlighting a representation of the vehicle and/or of the at least one stationary element or mobile object; and continuously displaying the situational image in the vehicle when the vehicle is moving;
- wherein the situational image comprises at least a future trajectory of the vehicle and a future trajectory of at least one mobile object.

12. The method for maintaining the situational awareness according to claim 11, wherein
the determining vehicle situation information includes:
identifying stationary elements and/or mobile objects around the vehicle, and
calculating the vehicle situation information so that the vehicle situation information includes:
- at least one estimated future trajectory, estimated for the vehicle and/or for at least one mobile object identified around the vehicle; and/or
- at least one estimated collision risk level and/or priority rankings, for the vehicle and/or for at least one mobile object identified around the vehicle; and the additional driving information includes information related to the at least one estimated future trajectory and/or the at least one estimated collision risk level and/or priority rankings.

13. The method for maintaining the situational awareness according to claim 11, wherein
the determining vehicle situation information includes identifying stationary elements and/or mobile objects around the vehicle, so that the vehicle situation information includes information of the identified stationary elements and/or mobile objects; and
the calculating the situational image includes a step of, based on the vehicle situation information, classifying the identified stationary elements and mobile objects between those which are to be shown in the situational image, those which are not to be shown in the situational image, and those which are to be shown in the less visible way; whereby the situational image is calculated based on classification performed by a elements and mobile objects classification unit.

14. A non-transitory computer readable medium having stored thereon a computer program comprising instructions which, when the computer program is executed by a computer, cause the computer to implement the method according to claim 11.

* * * * *